United States Patent [19]
Pötzsch

[11] Patent Number: 4,989,488
[45] Date of Patent: Feb. 5, 1991

[54] DRIVE MECHANISM FOR AN OSCILLATING TOOL, ESPECIALLY A SAW BLADE

[75] Inventor: Rolf Pötzsch, Freudenberg, Fed. Rep. of Germany

[73] Assignee: Albrecht Baumer K.G., Spezialmaschinenfabrik, Freudenberg, Fed. Rep. of Germany

[21] Appl. No.: 339,171

[22] Filed: Apr. 14, 1989

[30] Foreign Application Priority Data

Apr. 15, 1988 [DE] Fed. Rep. of Germany ....... 3812587

[51] Int. Cl.⁵ ............................................. B26D 5/16
[52] U.S. Cl. ...................................... 83/783; 83/628; 83/633
[58] Field of Search ............... 74/54, 47; 30/392, 393, 30/394; 83/783, 779, 784, 778, 602, 605, 628, 633, 785, 776, 769; 411/358; 24/135 R

[56] References Cited

U.S. PATENT DOCUMENTS

| 192,597 | 7/1877 | Penney | 83/784 X |
|---|---|---|---|
| 1,172,406 | 2/1916 | Taylor | 411/395 |
| 1,820,294 | 8/1929 | Anderson | 83/785 |
| 2,037,121 | 4/1936 | Dean | 83/785 X |
| 2,669,209 | 2/1954 | Hoffman | 24/135 R |
| 2,810,410 | 10/1957 | Alsina | 83/785 |
| 2,966,178 | 12/1960 | Katzfey | 83/779 |
| 4,038,721 | 8/1977 | Kendzior | 30/394 X |

FOREIGN PATENT DOCUMENTS 3312133 1/1988 Fed. Rep. of Germany .

Primary Examiner—Frank T. Yost
Assistant Examiner—Kenneth E. Peterson
Attorney, Agent, or Firm—Herbert Dubno

[57] ABSTRACT

The drive mechanism for the oscillating tool has a transmission device comprising a band, rope or the like oscillating longitudinally under tension. This transmission device is driven by a connecting rod driven by an eccentric pin which is drivable with an electric motor. To reduce manufacturing expenses and lengthen service life as well as provide a higher operating performance, the connecting rod is pivotally connected to rocker member, with whose free end the transmission device, e.g. a band, extending transverse to it, is connected. To accomplish this the free end of the rocker member is provided with a clamping device for the transmission device and a coupling bolt on which an eye of the connecting rod is engaged.

5 Claims, 2 Drawing Sheets

DRIVE MECHANISM FOR AN OSCILLATING TOOL, ESPECIALLY A SAW BLADE

FIELD OF THE INVENTION

My present invention relates to a drive mechanism for an oscillating tool, especially a saw blade.

BACKGROUND OF THE INVENTION

German Pat. No. 33 12 133 describes a drive mechanism for an oscillating tool, e.g. for a saw blade used in a foam shaping and cutting machine.

The mechanism comprises a transmission device, e.g. a guided band under tension connected at its ends with both ends of the tool (the blade). The transmission device connected with the tool is oscillated by a connecting rod driven by a power-driven eccentric pin.

The foam shaping and cutting machine of this patent has its oscillating cutting band formed like a saw blade and used as the tool. The blade is held at both ends pivotably in a clamping device and is held by a band or rope guided under tension on a polygon-like course over rollers under tension.

This band simultaneously transmits the oscillating drive motion. This motion is caused by an eccentric pin mounted directly on one end of the shaft of an electric motor. The eccentric pin is engaged by the bearing of a connecting rod which is moved along a guide defining a slide which is connected with a driven band under tension.

Because of this slide transmission mechanism, lateral wandering of the band or rope extending centrally through the guide is strictly precluded.

However this system is very expensive and the drive mechanism is subject to a high degree of wear. The performance of this kind of drive mechanism is limited. Thus it can be used with an electric motor having a rotation speed of 1250 revolutions per minute and the displacement, adjustable by the eccentricity, may not exceed 20 mm.

OBJECTS OF THE INVENTION

It is an object of my invention to provide an improved drive mechanism of the above-described type for an oscillating tool, especially an oscillating saw blade, which is less expensive than the current drive mechanism.

It is also an object of my invention to provide an improved drive mechanism of the above-described type for an oscillating tool, especially an oscillating saw blade, which is subject to less wear and is characterized by a higher maximum cutting rate.

It is an additional object of my invention to provide an improved drive mechanism of the above-described type for an oscillating tool, especially an oscillating saw blade, which can be driven by an electric motor having a higher rotation speed than has been possible up to now and which has a greater working displacement for the oscillating tool than has been possible heretofore.

SUMMARY OF THE INVENTION

These objects and others which will become apparent hereinafter are attained in a drive mechanism which has a pivoting or rocker member with one end at a stationary pivot and one free end, the free end being provided with a clamping device for the transmission device and also with a coupling bolt with which an eye of the connecting rod is engaged.

A simple pivoting or rocker member with commercially available bearings has an easy precise definite action without significant wear. Not only may an eccentric pin of a higher eccentricity be used, but also a lever arm length for the pivoting member which increases further the operating displacement caused by the eccentric body may be used.

It has been found that, although the coupling point of the driven rope or band now is guided along a peripheral portion of the pivoting path of the pivoting member, difficulties do not occur. For example kinking of the band or rope is avoided so that a coupling of the pivoting member to the band by two connecting rods requiring additional mass and additional expense, can be avoided.

The connecting device advantageously has a clamping bolt with a bolt head having a plurality of surfaces mounted in an eccentric hole provided in the free end of the rocker member.

The clamping bolt may be provided with a clamping piece securable by a plurality of securing screws against the surfaces of the bolt head Advantageously the head surfaces of the clamping bolt and a plurality of surfaces of the clamping piece secured against the eccentric pin have a plurality of grooves for holding the transmission device, e.g. the band, in place along a common diameter.

The drive mechanism is made less massive when at least the clamping bolt is provided with a blind hole.

An end of the shaft of the electric motor can be covered and gripped by a cap, which is connected eccentrically with that end of the shaft by a clamping screw engaged in the shaft and the cap is provided with an eccentric pin engaged in a connecting rod bearing of the connecting rod offset about 180° from the clamping screw. The connecting rod bearing can be formed by two roller bearings mounted in succession axially.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
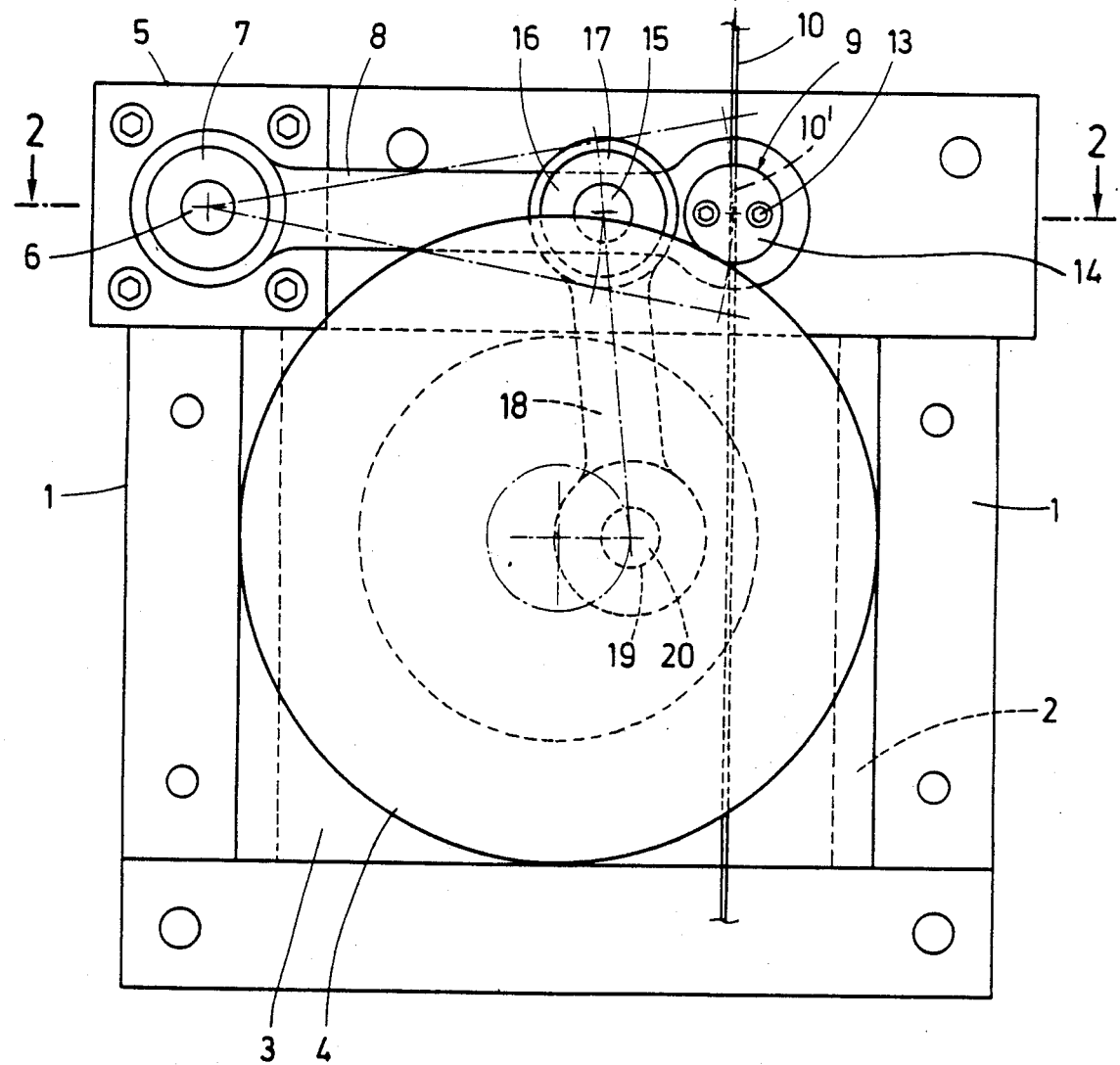
FIG. 1 is a view of a drive mechanism for an oscillating tool as seen from the side having the motor.

A motor support 3 (FIG. 1) is mounted by spacers 2 on base plates 1 as shown in the drawing. A U-shaped housing is thus formed in which an electrical motor 4 (FIG. 2) is flanged to the motor support 3. A mounting plate 5 on which one end 8' of a rocker member 8" or lever is mounted at a stationary location by two roller bearings 7 is attached to the base plates 1 by a bearing belt 6.

The free end 8" of this rocker member 8" is provided with a clamping or gripping device 9, in which a band 10 comprising the transmission device is coupled with the tool T under tension by its initial adjustment and its oscillation motion.

In an eye 9' provided on the free end 8" of the rocker member there are two orially spaced receiving roller bearings 11 a clamping bolt 12 which is both rotatable and pivotable. The clamping bolt 12 is equipped with a blind hole 25 extending from its free end for reduction of its mass.

A clamping piece 14 the clamping and gripping device, is secured by securing screws 13 against the surfaces 12" of the head of the clamping bolt 12. The head surface 12" of the clamping bolt 12 and the clamping piece 14 opposing each other contain grooves 10' extending along their diameter to set the position of the band 10 clamped between them.

Figure 2:
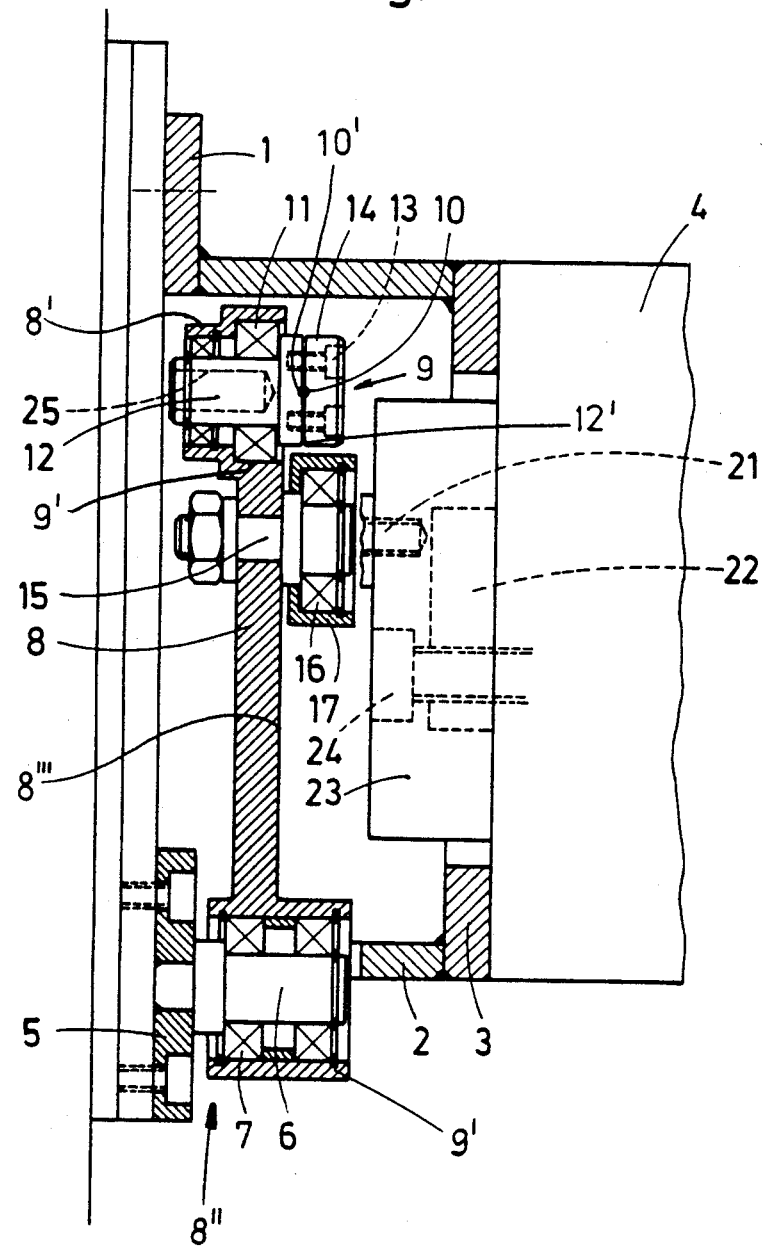
FIG. 2 is a cross sectional view through the drive mechanism taken along the line II—II of FIG. 1.

A coupling bolt 15 is connected to a portion of shank 8' of the rocker member 8. This coupling bolt 15 is provided with roller bearings 16, which engage in the eye 17 of a connecting rod 18 (FIG. 1).

The other end of the connecting rod is equipped with a mounting hole 19 for a roller bearing 20 which engages an eccentric pin 21 which is mounted with a predetermined eccentricity on a cap 23 which covers an end of the shaft 22 of the electric motor 4 and is connected with it by a clamping screw 24 engaged in an eccentric threaded blind hole.

The eccentric pin 21 is offset relative to the hole for the clamping screw 24 by about 180° to prevent interference by providing the largest possible spacing between both. Thus the eccentricity of the eccentric pin 21 can be chosen freely and independently of that of the clamping screw 24.

The operation of the apparatus according to my invention in practice is as follows:

The connecting rod 18 which oscillates the coupled rocker member 8 with a comparatively small period inside the angular region indicated by dot-dashed lines in FIG. 1 is driven by an electric motor 4 with its rotational speed and with the eccentricity or throw of the eccentric pin 21.

The displacement increased by the lever action of the rocker member 8 occurs in the vicinity of the eye 9' provided in the free end 8' of the rocker member 8 and is transmitted by the clamping device 9 to the band 10, cable, rope or like driving the tool T.

Since this clamping device is mounted with easy action in the eye of the rocker member 8, it is continuously adjusted by the tension on the band 10 so that no kinking occurs. Also according to the peripheral line along the pivot angle only slight lateral pivoting of the clamping device 9 and its mounted position and/or the axis of the guide rollers occurs. It has been shown that these slight pivoting motions are insignificant and do not impair operation.

It has proven to be advantageous that not only electric motors with speeds which are higher than have been used up to now are usable with my invention but also higher eccentricities of the eccentric pin are practical and thus, for example, the operating displacement can be increased by a factor of 2.5 times beyond what has been known up to now and thus a correspondingly higher tool speed and cutting performance is attained.

The structure of the drive mechanism is comparatively simple and inexpensive. Also the comparatively small accelerated mass is advantageous, which as shown in the embodiment above, can be further reduced by introduction of recesses. It has proven to be advantageous that the eccentricity may be chosen from a comparatively wide range of values.

It is also advantageous that the moving parts are mounted in roller bearings which require only a minor expense and guarantee both ease of action and extraordinarily long service life. The desired displacement may be influenced by the eccentricity or throw of the driven eccentric pin 21 and also by the dimensions and conditions for mounting of the rocker member 8 as well as by the amount of extension of the rocker member beyond the coupling bolt 15 or by the displacement of the coupling bolt in the direction increasing to the mounting bolts.

By definition the two roller bearings 16 comprise a connection rod bearing which is referred to in the following claims.

I claim:

1. A drive mechanism for an oscillating tool, the drive mechanism comprising:
    a housing;
    a motor supported on said housing and having a shaft rotatable about a shaft axis and having an end;
    a connecting rod having a shaft end and a rocker end;
    an eccentric pin connecting said shaft end of the connecting rod with the end of said shaft, the pin having a pin axis parallel to and spaced transversely from said shaft axis, said connecting rod extending transversely to said shaft;
    an elongated linear rocker lever formed with a pivoted end mounted pivotally about a fixed rocker axis parallel to said shaft axis on said housing and a free end spaced from said pivoted end, said rocker end of said connecting rod being pivotally connected with said rocker lever between said pivoted and free ends of the rocker lever, said connecting rod oscillating said free end of said lever about said rocker axis upon rotation of said shaft; and
    a clamping device provided on said free end of said rocker lever, said device including:
        a clamping bolt freely rotatable on the free rocker-lever end about a bolt axis parallel to said shaft and rocker axes and having a bolt head,
        a clamping piece fixed on the bolt head for joint rotation therewith about the bolt axis during oscillation of the tool, said clamping piece and said bolt head being formed with respective grooves juxtaposed with one another and extending perpendicular to said bolt and shaft axes regardless of angular position of said free end of said member, whereby a band connecting a tool with said free end of the lever can be engaged between the bolt head and the clamping piece, and
        means for connecting said clamping piece with said bolt head to clamp said band therebetween in the grooves.

2. The drive mechanism defined in claim 1 wherein said means for connecting the bolt head and the clamping piece is a plurality of securing screws.

3. The drive mechanism defined in claim 1 wherein said bolt is provided with at least one blind hole.

4. The drive mechanism defined in claim 1 wherein said connecting rod is provided with a rod bearing pivotally connecting said rocker end of said rod with said lever.

5. The drive mechanism defined in claim 4, further comprising
    a cap attached to said end of said shaft by an attaching screw having an axis parallel to said shaft axis and offset about said shaft axis by 180° from said pin axis.

* * * * *